United States Patent [19]

Suzuki

[11] Patent Number: 4,835,450
[45] Date of Patent: May 30, 1989

[54] METHOD AND SYSTEM FOR CONTROLLING ROBOT FOR CONSTRUCTING PRODUCTS

[75] Inventor: Tetsuo Suzuki, Yokohama, Japan

[73] Assignee: Kabushiki Kaisha Toshiba, Kawasaki, Japan

[21] Appl. No.: 196,062

[22] Filed: May 19, 1988

[30] Foreign Application Priority Data

May 21, 1987 [JP] Japan .................................. 62-124606

[51] Int. Cl.$^4$ ............................................ G05B 19/42
[52] U.S. Cl. .................................. 318/568.13; 901/9; 901/47; 901/45; 901/14; 364/478; 414/730
[58] Field of Search ...................... 318/568; 901/9, 14, 901/45, 47; 364/478; 414/730

[56] References Cited

U.S. PATENT DOCUMENTS

| | | | |
|---|---|---|---|
| 4,281,342 | 7/1981 | Ueda et al. | 358/93 |
| 4,287,459 | 9/1981 | Dahlstrom | 318/568 |
| 4,305,130 | 12/1981 | Kelley et al. | 364/513 |
| 4,373,804 | 2/1983 | Pryor et al. | 356/1 |
| 4,575,304 | 3/1986 | Nakagawa et al. | 414/730 |
| 4,691,446 | 9/1987 | Pitcher et al. | 901/47 X |

OTHER PUBLICATIONS

Proc. IECON'86; M. Nagata; 1986, IEEE "Interprocess Communication for Robot Control".
"A Petri Net Based Controller for Flexible and Maintainable Sequence Control and its Application in Factory Automation" IEEE Trans. Industrial Electronics IE-33, 1: T. Murata et al.; 1986. This Article Proposes a New Type Controller Based on a Petri Net (a kind of directed graph) like Control Language.
Perez et al., Computer Aided Technologies, 9/13-19/85, pp. 489-492, "Intelligent Robot Simulation System: The Vision Guided Robot Concept".
Toshio et al., Computers in Industry, vol. 7, No. 3, Jun. 1986, pp. 211-225, "An Approach to Model-Based Robot Software for Industrial Applications".
Lozano-Perez, Proceedings of the IEEE, vol. 71, No. 7, Jul. 1983, pp. 821-841, "Robot Programming".
Fouic et al., Le Nouvel Automatisme, vol. 26, No. 21, Apr. 1981, pp 52-61 "Initiation a la Robtique 6-Systeme de Commande des Robots: Programmation de la Tache".
Lozano-Perez, Proceedings 1987, IEEE International Conference on Robotics and Automation, Mar. 31st-Apr. 3rd, 1987, pp. 843-849, "Handey: A Robot System that Recognizes, Plans, and Manipulates".
McMillen et al., Proceedings 1985 IEEE International Conference on Robotics and Automation, Mar. 25th-28, 1985, pp. 45-45, "An Intelligent Robot Vision System for Research Applications".

Primary Examiner—William M. Shoop, Jr.
Assistant Examiner—Saul M. Bergmann
Attorney, Agent, or Firm—Cushman, Darby & Cushman

[57] ABSTRACT

A 3-dimensional form of a sample product constituted by a plurality of parts having known forms is measured by imaging the sample product from a plurality of directions. Arrangement data representing the 3-dimensional positions and orientations of the parts constituting the sample product are obtained, by a construction detecting module, on the basis of the measured 3-dimensional form of the sample product. A task planning module sets a task for moving a part to be used for constructing a product and the sequence of the task by using arrangement data acquired by the construction detecting module. Upon generation of motion command data for controlling a robot for constructing the product in accordance with the task set by the task planning module, the generated motion command is output to a motion control module. The construction robot is controlled by the motion control module, whereby a product the same as the sample product is constructed.

7 Claims, 9 Drawing Sheets

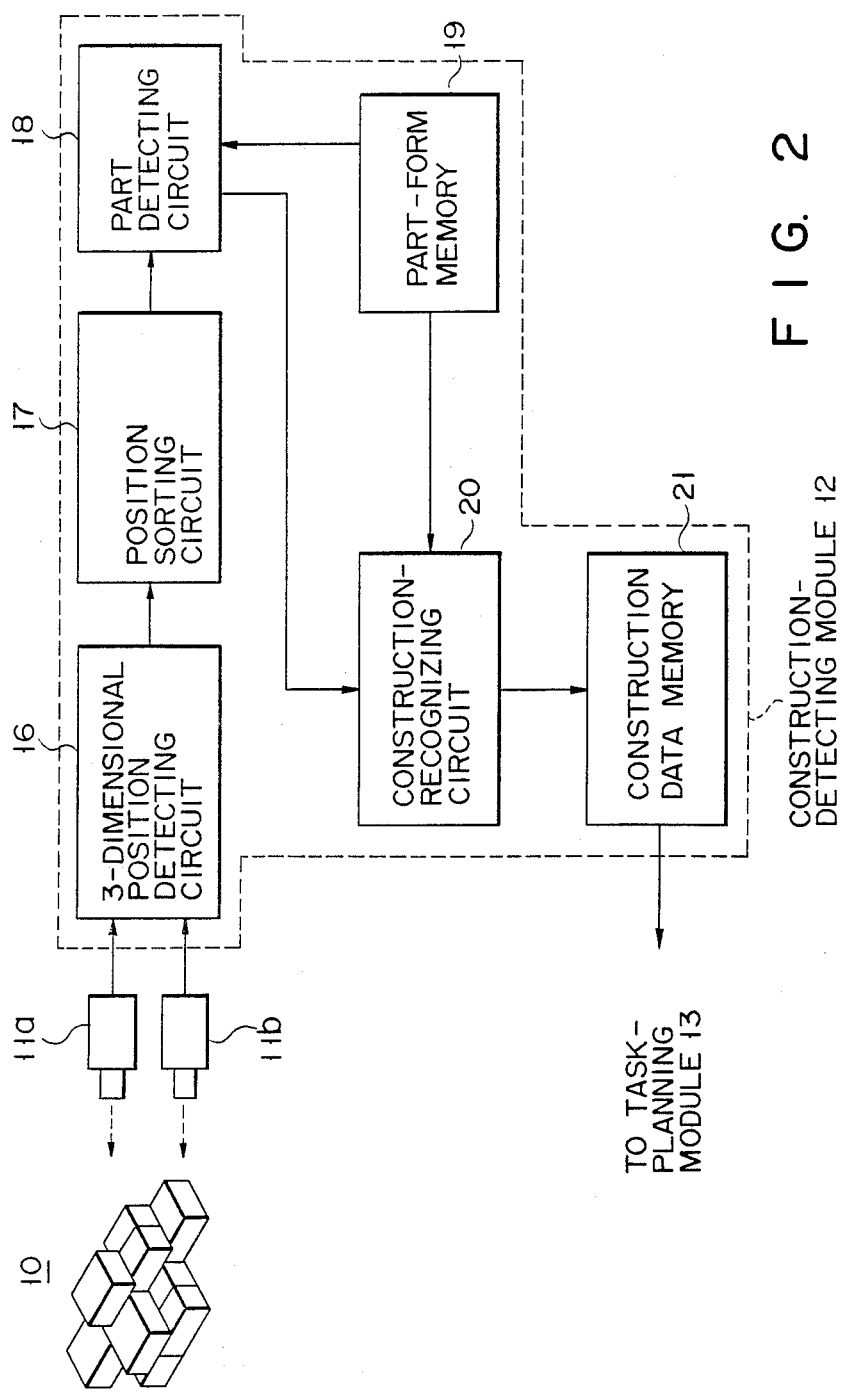
F I G. 2

TASK MEMORY 22

| ADDRESS | TASK | SEQUENCE NUMBER |
|---|---|---|
| 1 | | |
| 2 | | 3 |
| 3 | | 2 |
| ⋮ | ⋮ | ⋮ |
| | | 1 |
| ⋮ | ⋮ | ⋮ |
| N | | |

FIG. 5

STANDARD OPERATION FUNCTION MEMORY 23

$$P_1(X_1,Y_1,Z_1,A_1,B_1,\Gamma_1,V_1) = f_1(x_1,y_1,z_1,\alpha_1,\beta_1,\gamma_1)$$
$$P_2(X_2,Y_2,Z_2,A_2,B_2,\Gamma_2,V_2) = f_2(x_2,y_2,z_2,\alpha_2,\beta_2,\gamma_2)$$
$$\vdots$$
$$P_n(X_n,Y_n,Z_n,A_n,B_n,\Gamma_n,V_n) = f_n(x_n,y_n,z_n,\alpha_n,\beta_n,\gamma_n)$$

FIG. 6

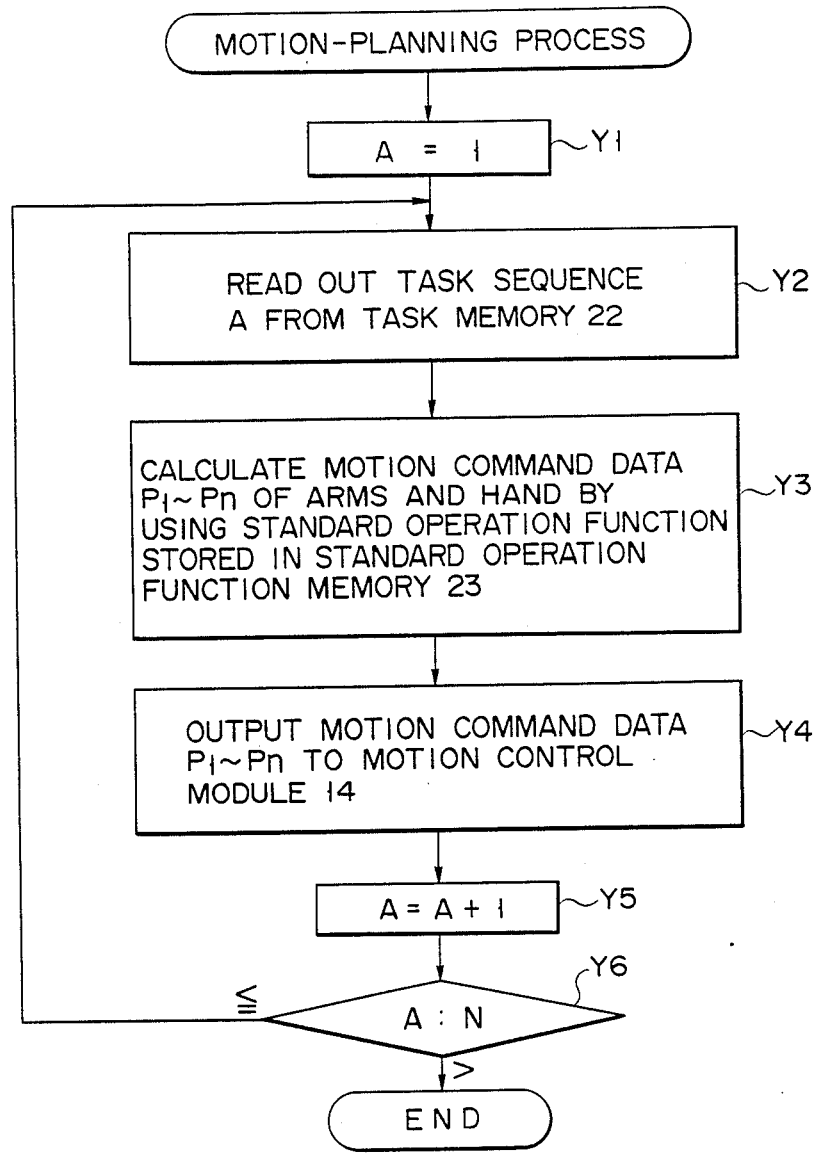
F I G. 10

METHOD AND SYSTEM FOR CONTROLLING ROBOT FOR CONSTRUCTING PRODUCTS

U.S. application Ser. No. 07/196,061 filed May 19, 1988 and U.S. application Ser. No. 07/196,063 filed May 19, 1988 are related applications.

BACKGROUND OF THE INVENTION

1. Field of the Invention

The present invention relates to a method and system for controlling a robot by detecting the construction of a sample product constituted by a plurality of parts having known forms and thereafter automatically constructing a product identical to the sample product.

2. Description of the Related Art

A conventional robot for constructing a product by assembling a plurality of parts sequentially conveyed by a conveyer, for example, operates in the following manner:

First, an operator studies the construction of a sample product and calculates 3-dimensional positions and orientations of the respective parts included therein, to determine the operations required for moving the parts, sequentially conveyed by a conveyer or the like, to predetermined positions for construction into a product, as well as to determine the sequence (construction sequence) in which the operations are performed for constructing the product.

In addition, a system has been developed wherein sensors having functions such as visual and tactile senses and the like are attached to a construction robot, so that the positions of the respective parts during the construction of a product can be automatically corrected, and a construction task can be automatically changed in accordance with prestored programs.

Moreover, still another conventional robot has been proposed which automatically constructs a product in accordance with tsk for the respective parts and task sequence obtained by CAD (computer aided design) stored in a host computer.

In general, however, the programming for controlling a robot for constructing products is very complicated. In addition, an accident may occur because of an erroneous operation due to a program error when the program for operating many arms and hands of the robot is checked by actually operating the robot.

A program for automatically correcting the positions of the respective parts used for constructing a product by using the above-described sensors having functions such as visual and tactile senses, and the like, is further complicated.

When programming for controlling the robot is automatically performed by utilizing CAD, the above-described problems do not then occur. However, when automatic designing of a program for a product to be constructed is performed by the host computer, task sequences which are not directly related to the automatic designing must be processed. This makes very complex programming for automatic designing.

As has been described above, the programming for controlling a robot for constructing products tends, conventionally, to be very complicated. In addition, when the form of a product to be constructed is even only slightly changed, a new program must be created. When automatic designing of a program is performed by using CAD, the program must be changed by products, particularly, the program is complicated in the case of constructing a few products for various products.

Therefore, even when the construction of a product to be constructed is changed, it is desired to automatically construct the product without changing a program for controlling the constructing robot.

SUMMARY OF THE INVENTION

It is an object of the present invention to provide a method and system for detecting the construction of a sample product constituted by a plurality of parts having known forms, by means of which a product identical to the sample product can be constructed automatically thereafter.

According to the present invention, there is provided a method for controlling a robot for constructing a subject product having the same construction as that of a sample product and constituted by a plurality of sample parts having known forms, the method comprising the steps of measuring a 3-dimensional form of the sample product by imaging the sample product from a plurality of directions, detecting the construction of the sample product from the measured 3-dimensional form of the sample product and forms of the sample parts constituting the sample product, thereby acquiring arrangement data of the sample product, setting a task for moving a subject part used for constructing the subject product to a position represented by the arrangement data, setting a task sequence of the task for construction of the subject product, generating motion command data for controlling the robot in accordance with the set task sequence, and controlling the robot in accordance with the generated motion command data.

In addition, according to the present invention, there is provided a system for controlling a robot for constructing a subject product having the same arrangement as that of a sample product constituted by a plurality of sample parts having known forms, the system comprising 3-dimensional form measuring means for measuring a 3-dimensional form of the sample product by imaging the sample product from a plurality of directions, construction detecting means for detecting construction of the sample product from the 3-dimensional form of the sample product measured by the 3-dimensional form measuring means and forms of the sample parts constituting the sample product, and for acquiring arrangement data of the sample product, task setting means for setting a task required for moving a subject part, used for constructing the subject product, to a position represented by the arrangement data acquired by the construction detecting means, task sequence setting means for setting a sequence of the task set by the task setting means, generating means for generating motion command data for controlling the robot in accordance with the task sequence set by the task sequence setting means, and controlling means for controlling the robot in accordance with the motion command data generated by the generating means.

BRIEF DESCRIPTION OF THE DRAWINGS

FIG. 2 is a block diagram showing an arrangement of a construction detecting module;

FIG. 5 is a view showing the contents of a task memory in a task planning module;

FIG. 6 is a view showing standard operation functions stored in a standard operation function memory;

FIG. 10 is a flow chart showing an operation of a motion planning section in the task planning module.

DETAILED DESCRIPTION OF THE PREFERRED EMBODIMENT

An embodiment of the present invention will be described with reference to the accompanying drawings.

Figure 1:
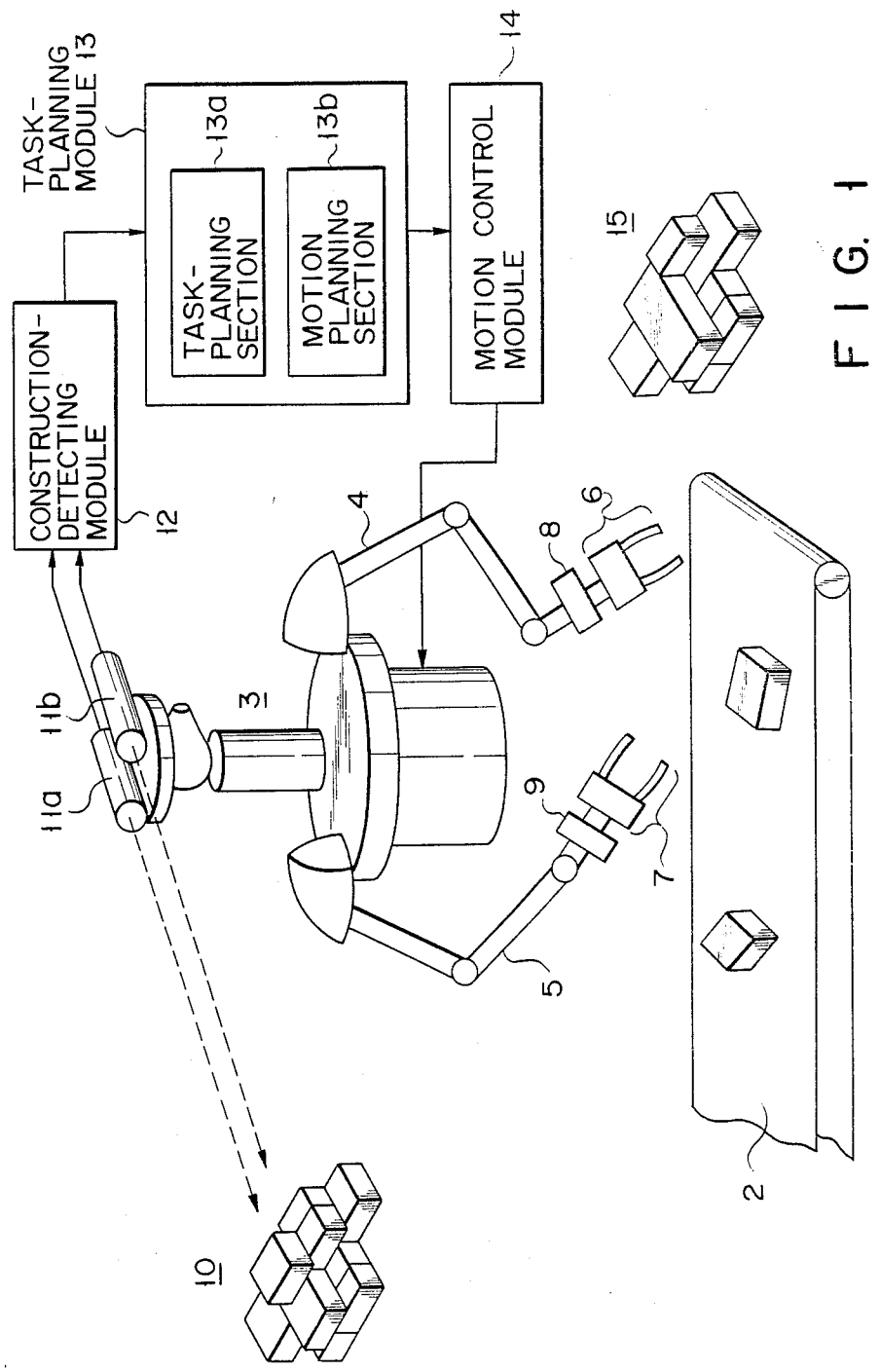
FIG. 1 is a view showing an arrangement of a constructing robot control system according to an embodiment of the present invention.

Referring to FIG. 1, robot 3 is installed adjacent to conveyor 2 for sequentially conveying parts having the same forms as known forms of parts included in sample 10. Two arms 4 and 5 having hands 6 and 7 for gripping parts, and pressure sensors 8 and 9 for detecting pressures when hands 6 and 7 grip the parts on conveyer 2, are attached to robot 3. In addition, a pair of CCD (charge coupled device) cameras 11a and 11b are mounted on robot 3 so as to obtain a 2-dimensional form of sample 10 having the same arrangement as that of a product to be constructed.

CCD cameras 11a and 11b mounted on robot 3 acquire 2-dimensional image data obtained when sample 10 is viewed from various directions, and output these 2-dimensional image data to construction detecting module 12. Construction detecting module 12 detects construction data representing the construction of sample 10 using the 2-dimensional image data, and outputs these construction data to task planning module 13. Task planning module 13 including task planning section 13a and motion planning section 13b forms motion command data for controlling robot 3 in accordance with the construction data of sample 10, and outputs the motion command data to motion control module 14. Motion control module 14 controls robot 3 in accordance with this motion command data.

Robot 3 is of an intelligent type having sensors. For example, when motion command data is output from motion control module 14 to robot 3 so as to move a part on conveyor 2 to a predetermined position, an operation of moving the part is performed by correcting an operation of robot 3 in accordance with feedback signals from the pair of CCD cameras 11a and 11b, and pressure sensors 8 and 9. Accordingly, robot 3 constructs a product identical with sample 10 by gripping the parts sequentially conveyed by conveyor 2 using hands 6 and 7. Note that semi-finished product 15 is obtained in the course of the constructing operation of a product.

An operation of the system will be described below.

Figure 3:
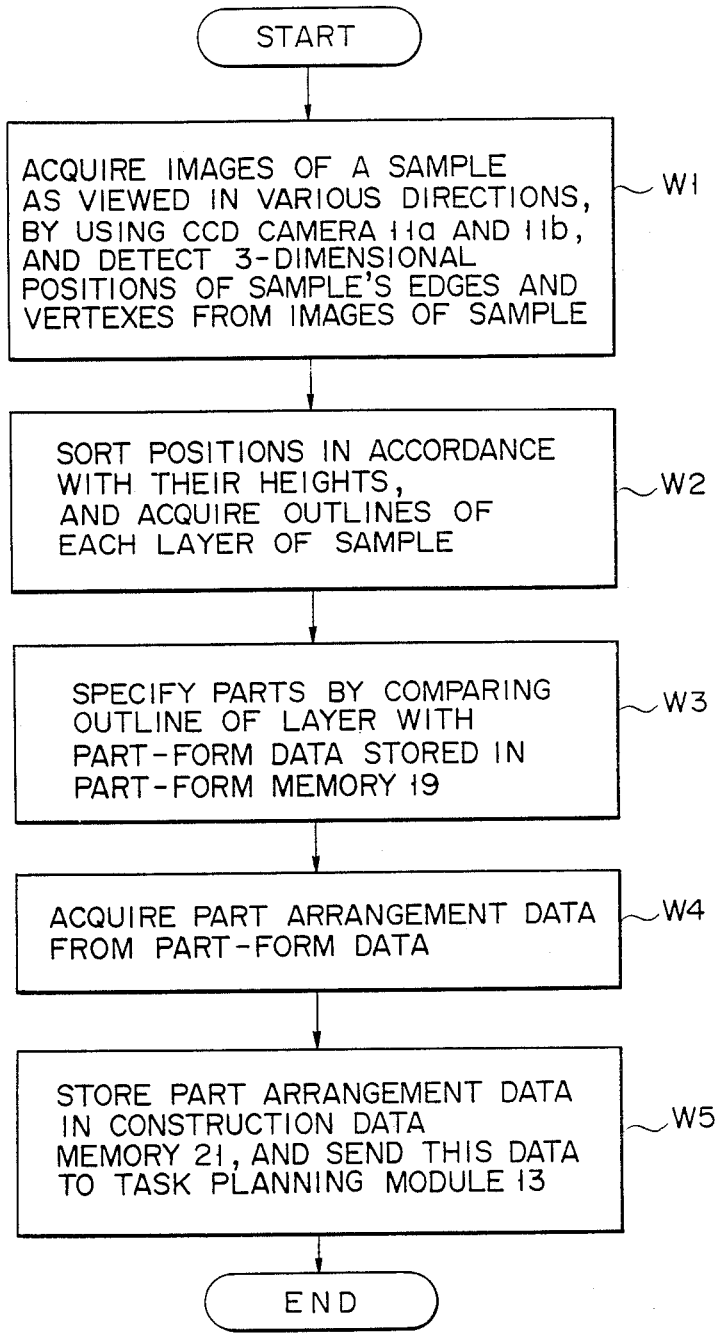
FIG. 3 is a flow chart showing an operation of the construction detecting module.

Construction detecting module 12 in FIG. 2 is operated in accordance with the flow chart in FIG. 3.

In step W1, images of sample 10 viewed from various directions are acquired by moving the pair of CCD cameras 11a and 11b around sample 10, or rotating sample 10, and 2-dimensional image data are obtained. By imaging sample 10 from various directions, data of a portion which cannot be seen from a single direction, i.e., 2-dimensional data of a portion in the shade can be obtained. In addition, 3-dimensional positions of the vertex and edges of sample 10 are detected by 3-dimensional position detecting circuit 16 on the basis of 2-dimensional image data imaged from various directions using CCD cameras 11a and 11b.

In step W2, the 3-dimensional positions of the respective vertexes and edges of sample 10 detected by 3-dimensional position detecting circuit 16 are sorted by position sorting circuit 17 by the height direction (Z-axis direction) so as to obtain layer outline data representing an outline of each layer of sample 10 of each height.

In step W3, part detecting circuit 18 compares the layer outline data of each height obtained by position sorting circuit 17 with form data of each part stored in part-form memory 19, thereby specifying parts included in each layer. Note that the respective data including layer form data for specifying the 3-dimensional forms of the parts included in sample 10 is prestored in part-form memory 19.

Figure 4:
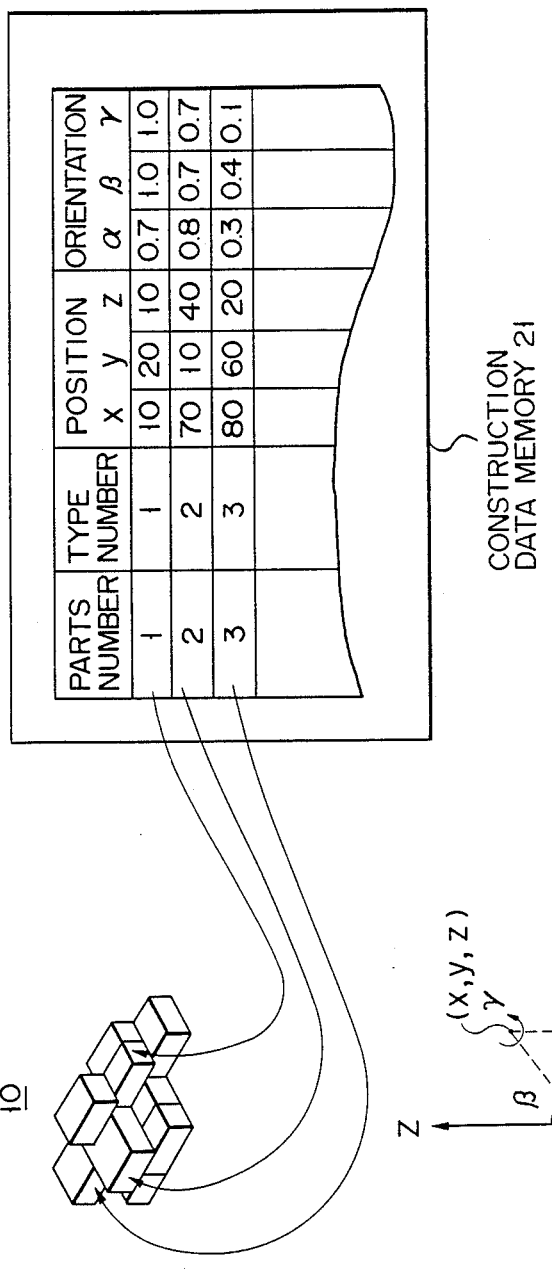
FIG. 4 is a view showing the contents of a construction data memory.

In step W4, construction recognizing circuit 20 acquires part arrangement data including the 3-dimensional positions and orientations of the parts included in sample 10 by using the part data of each height detected by part detecting circuit 18 and the part-form data read out from part-form memory 19, and stores this part arrangement data in construction data memory 21 (step W5). As shown in FIG. 4, construction data memory 21 stores parts numbers, type numbers, position data representing 3-dimensional positions (x, y, z), and posture data representing orientation ($\alpha$, $\beta$, $\gamma$) at the corresponding positions of the parts included in sample 10 in units of parts. The part arrangement data stored in construction data memory 21 in step W5 is output to task planning module 13.

Task planning module 13 for planning a task sequence for controlling the robot will be described below.

As shown in FIG. 5, task planning module 13 comprises task memory 22 for storing the respective task data including movement data for moving the parts sequentially conveyed by conveyer 2 to positions determined by the part arrangement data. Task memory 22 includes sequence number area 22a for storing sequence numbers of tasks.

As shown in FIG. 6, task planning module 13 comprises standard operation function memory 23. Robot 3 performs tasks for moving the parts conveyed by conveyer 2 to the positions determined by the part arrangement data stored in construction data memory 21. Actual motion command data P1, P2, ..., Pn for driving arms 4 and 5, and hands 6 and 7 attached to robot 3 are defined as functions f1, f2, ..., fn using position data for gripping parts on conveyer 2, position data (x, y, z) of destinations of the parts, and orientation data ($\alpha$, $\beta$, $\gamma$) at the corresponding positions, and the like as parameters. These functions are stored in standard operation function memory 23. In these functions, parameters X, Y, and Z represent moving positions of the arms and hands of the robot, parameters A, B, and T represent the orientations at the corresponding positions, and parameter V represents the moving speeds of the arms and hands of the robot. Since positions where robot 3 grips the respective parts are automatically detected by using CCD cameras 11a and 11b, these data is often excluded from the functions described above, and is not shown in FIG. 6.

Figure 7:
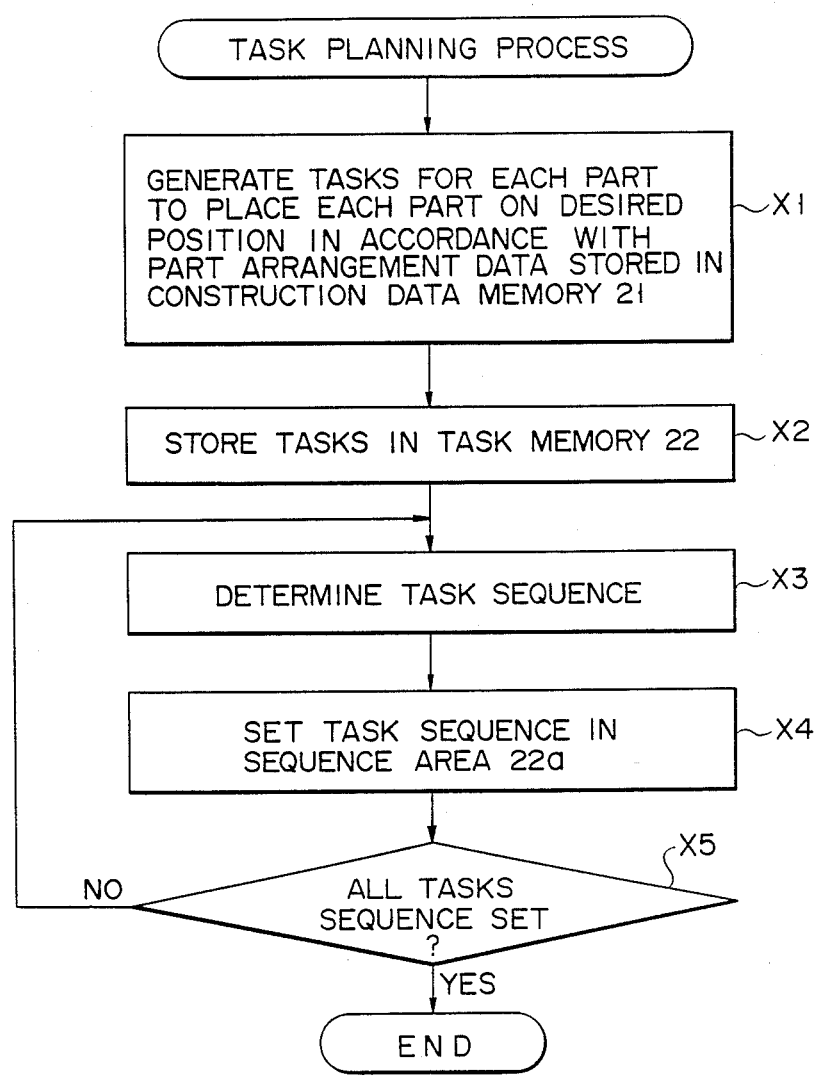
FIG. 7 is a flow chart showing an operation of an task planning section in the task planning module.

Task planning section 13a is operated in accordance with the flow chart shown in FIG. 7.

More specifically, in step X1, tasks for moving the parts to the predetermined positions are defined in accordance with the part arrangement data including the 3-dimensional position data and the orientation data, stored in construction data memory 21. In step X2, the tasks of the respective parts formed in step X1 are sequentially stored in task area 22b of task memory 22.

After the tasks of all the parts are stored in task memory 22 in step X2, task sequence set in the respective tasks are performed in steps X3 to X5. Accordingly, when a product is constructed in the same manner as described in FIGS. 8A to 8D, the task sequence is set on the basis of a predetermined constructing rule.

Figure 8A:
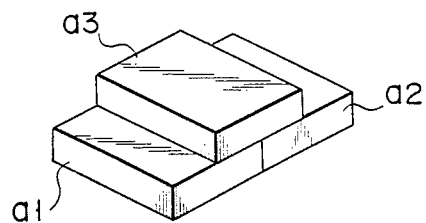
FIGS. 8A to 8D are views for explaining a constructing rule for constructing a product.

In the case shown in FIG. 8A, parts a1 and a2 located at a lower portion of a product to be constructed are mounted. Then, part a3 located at an upper portion of the product is mounted on parts a1 and a2 located at the lower portion. More specifically, height relationships between the parts are determined by comparing the positions of the part arrangement data stored in construction data memory 21 in the height direction (Z-axis direction), and the task sequences of the parts located at the lower portion are set prior to the task sequence of the part located at the upper portion.

Figure 8B:
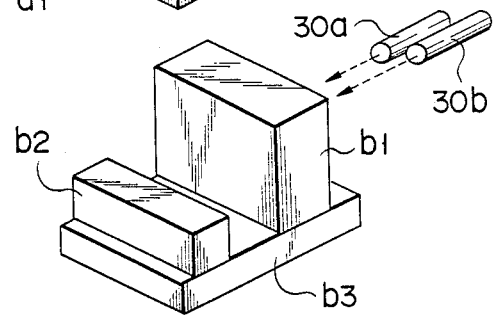

In the case shown in FIG. 8B, part b1 is mounted on part b3 after part b2 is mounted part b3 so as to assure the field of vision of CCD cameras 30a and 30b during a constructing operation of a product.

Figure 8C:
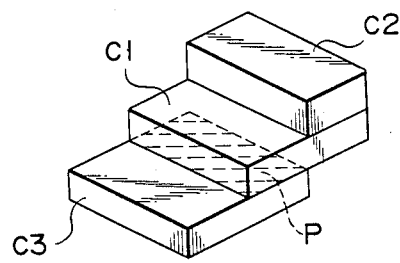

In FIG. 8C, when parts are sequentially constructed from part c3 located at a lower portion as shown in FIG. 8A, part c2 cannot be stably mounted. For this reason, parts c1 and c2 are assembled in advance, and then the assembled parts c1 and c2 are mounted on area P of part c3.

Figure 8D:
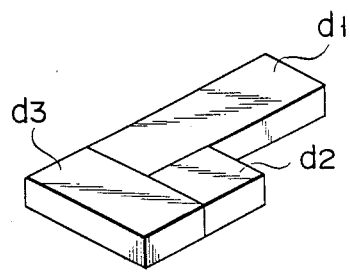
Figure 9A:
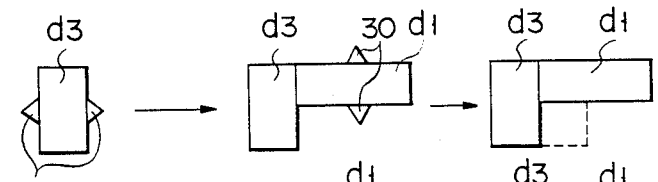
FIGS. 9A and 9B are views for explaining a constructing sequence for constructing a product as shown in FIG. 8D.
Figure 9B:
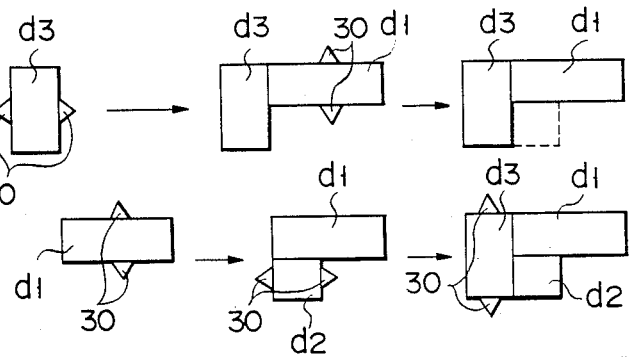

In FIG. 8D, when the parts are mounted in accordance with sequence shown in FIG. 9A, since each part is mounted while it is gripped by hand 30 of the robot, hand 30 of the robot is interfered by part d1 or d3 which has been already mounted around a position where part d2 is to be mounted, and hence part d2 cannot be mounted. For this reason, the parts are mounted in accordance with the sequence shown in FIG. 9B.

The tasks stored in task memory 22 are compared with each other in accordance with the constructing rule described above, the task sequence number of a task having a highest priority is set to be 1. Then, 1 is stored in a sequence area corresponding to the task. The remaining tasks are compared with each other except for the task having sequence number 1, and the sequence number of a task having a highest priority is set to be 2. Then, 2 is stored in a sequence area corresponding to the task. A task sequence of all the task stored in task memory 22 is set in this manner.

After the tasks and the task sequence are set in task memory 22, task planning section 13b is operated in accordance with the flow chart shown in FIG. 10.

In step Y1, task sequence A of task memory 22 is set to be 1. In step Y2, tasks are read out in accordance with the task sequence stored in task memory 22. In step Y3, motion command data P1 to Pn represented by the functions stored in standard operation function memory 23 are calculated using 3-dimensional position data and orientation data included in the readout task, and other various data required to perform the task. Calculated motion command data P1 to Pn are input to motion control module 14 (step Y4).

After motion command data P1 to Pn for driving arms 4 and 5, and hands 6 and 7 of robot 3 with respect to one task are calculated in the above-described manner, task sequence A is increased by one (step Y5). Steps Y2 to Y5 are repeated until task sequence A increased by one in step Y6 exceeds number N of task stored in task memory 22.

Figure 11:
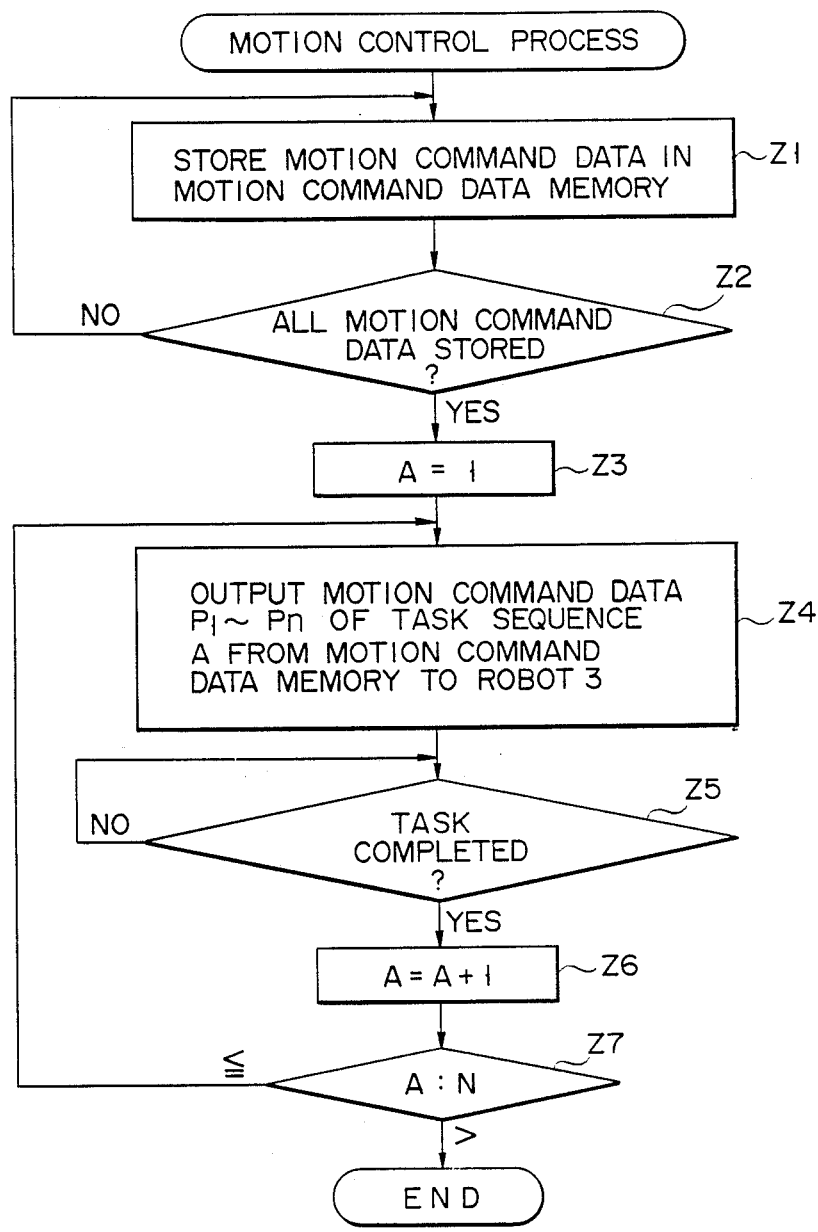
FIG. 11 is a flow chart showing an operation of a motion control module.

Motion control module 14 controls robot 3 using the motion command data output from task planning module 13b in accordance with the flow chart shown in FIG. 11.

More specifically, in step Z1, motion command data P1 to Pn output from task planning module 13b and the task sequence are stored in a motion command data memory (not shown) of motion control module 14. In step Z2, it is judged whether motion command data corresponding to all the tasks are stored in the motion command data memory. After all the motion command data are stored, task sequence A is set to be initial value 1. In step Z4, motion command data P1 to Pn corresponding to task sequence A are read out from the motion command data memory, and are output to robot 3. Robot 3 moves the parts sequentially conveyed by conveyer 2 to predetermined positions in accordance with motion command data P1 to Pn.

After one task is completed by robot 3 in step Z5, task sequence A is increased by one (step Z6). In step Z7, task sequence A increased by one is compared with number N of tasks. These tasks are repeated in steps Z4 to Z6 until task sequence A exceeds number N of tasks. When task sequence A exceeds final sequence N in step Z7, a task for constructing one product by robot 3 is ended.

Accordingly, the form data of the parts included in the sample are prestored in part-form memory 19. Then, sample 10 having the same arrangement with that of the product to be constructed is placed on a rotary table located within the field of vision of CCD cameras 11a and 11b attached to robot 3, and is rotated once. At this time, 2-dimensional image data of sample 10 in a plurality of directions are obtained by CCD cameras 11a and 11b. Then, the construction of sample 10 is detected by construction detecting module 12 on the basis of the obtained 2-dimensional image data. Task planning module 13 sets tasks and a task sequence for constructing the product and outputs motion command data to robot 3 through motion control module 14 for driving arms 4 and 5, and hands 6 and 7.

As has been described above, a product having the same arrangement as that of sample 10 can be automatically constructed by robot 3 by storing part-form data in advance. Accordingly, programs for detecting the 3-dimensional construction of sample 10 and setting an task sequence are predetermined so that the construction of a product can be arbitrarily by simply changing the construction of sample 10. Therefore, any full-time programmer is not required and task efficiency of a construction robot can be improved. In addition, every time the construction of sample 10 is changed, a program check is not required.

The present invention is not limited to the above-described embodiment, and various changes and modifications can be made within the spirit and scope of the invention. For example, robot 3 for constructing a product by moving parts, motion control module 14, construction detecting module 12 for detecting the construction of sample 10 and planning tasks, and task planning module 13 may be independently operated so that the number of construction detecting modules and task planning modules can be smaller than the number of robots and motion control modules when a plurality of construction robots are installed. This is because, construction detecting module 12 and task planning module 13 are required only when the construction of a product is changed.

What is claimed is:

1. A method for controlling a robot for constructing a subject product having the same construction as that of a sample product constituted by a plurality of sample parts having known forms, the method comprising the steps of:
   measuring a 3-dimensional form of the sample product by imaging the sample product from a plurality of directions;
   detecting the construction of the sample product from the measured 3-dimensional form of the sample product and forms of the sample parts constituting the sample product, thereby acquiring arrangement data of the sample product;
   setting a task for moving a subject part to a position represented by the arrangement data, used for constructing the subject product;
   setting a task sequence of the task for constructing the subject product;
   generating motion command data for controlling the robot in accordance with the set task sequence; and
   controlling the robot in accordance with the generated motion command data.

2. A method according to claim 1, wherein the arrangement data of the sample product includes 3-dimensional position data of the sample parts constituting the sample product and orientation data at corresponding 3-dimensional positions.

3. A method according to claim 1, wherein the data representing the forms of the sample parts are prestored so as to be compared with the data representing the 3-dimensional forms of the measured sample product.

4. A system for controlling a robot for constructing a subject product having the same arrangement as that of a sample product constituted by a plurality of sample parts having known forms, the system comprising:
   3-dimensional form measuring means for measuring a 3-dimensional form of the sample product by imaging the sample product from a plurality of directions;
   construction detecting means for detecting the construction of the sample product from the 3-dimensional form of the sample product measured by said 3-dimensional form measuring means and forms of the sample parts constituting the sample product, and for acquiring arrangement data of the sample product;
   task setting means for setting a task for moving a subject part, used for constructing the subject product, to a position represented by the arrangement data acquired by said construction detecting means;
   task sequence setting means for setting a task sequence of the task set by said task setting means;
   generating means for generating motion command data for controlling the robot in accordance with the task sequence set by said task sequence setting means; and
   controlling means for controlling the robot in accordance with the motion command data generated by said generating means.

5. A system according to claim 4, wherein the arrangement data of the sample parts, obtained by said construction detecting means, includes 3-dimensional position data of the sample parts constituting the sample product and orientation data at corresponding 3-dimensional positions.

6. A system according to claim 4, wherein said construction detecting means includes part-form memory means for storing data representing the forms of the sample parts constituting the sample product.

7. A system according to claim 4, wherein the data representing the form off the sample product are prestored in said part-form memory means and compared with the data representing the 3-dimensional form of the sample product measured by said 3-dimensional form measuring means.

* * * * *